(12) United States Patent
Arici et al.

(10) Patent No.: US 7,602,447 B2
(45) Date of Patent: Oct. 13, 2009

(54) METHOD AND APPARATUS FOR ADJUSTING THE CONTRAST OF AN IMAGE

(75) Inventors: Tarik Arici, Marietta, GA (US); Toygar Akgun, Atlanta, GA (US); Yucel Altunbasak, Norcross, GA (US)

(73) Assignee: Vestel Elecktronik Sanayi Ve, Organize Sanayi Bolgesi (TR)

( * ) Notice: Subject to any disclaimer, the term of this patent is extended or adjusted under 35 U.S.C. 154(b) by 801 days.

(21) Appl. No.: 11/340,956

(22) Filed: Jan. 26, 2006

(65) Prior Publication Data

US 2007/0171310 A1     Jul. 26, 2007

(51) Int. Cl.
*H04N 5/57* (2006.01)
(52) U.S. Cl. .......................... 348/687; 348/673
(58) Field of Classification Search ................ 348/687, 348/673, 688, 689, 678, 686, 707; 382/264, 382/265, 260, 274; *H04N 5/14, 5/57, 5/18, H04N 5/52*
See application file for complete search history.

(56) References Cited

U.S. PATENT DOCUMENTS

| | | | |
|---|---|---|---|
| 4,231,065 A | | 10/1980 | Fitch |
| 7,006,704 B2 * | | 2/2006 | Kobayashi et al. .......... 382/264 |
| 7,102,697 B2 * | | 9/2006 | Lei et al. .................... 348/678 |
| 7,409,104 B2 * | | 8/2008 | Vitsnudel et al. ............ 382/284 |
| 2005/0073702 A1 | | 4/2005 | Shaked |

FOREIGN PATENT DOCUMENTS

EP     1107181 A2     6/2001

OTHER PUBLICATIONS

Jong-Sen Lee; Digital Image Enhancement and Noise Filtering by Use of Local Statistics; IEEE Transactions on Pattern Analysis and Machine Intelligence, vol. PAMI-2, No. 2; Mar. 1980; (pp. 165-168).
Patrenahalli M. Narendra, et al.; Real-Time Adaptive Contrast Enhancement; IEEE Transactions on Pattern Analysis and Machine Intelligence, vol. PAMI-3, No. 6; Nov. 1981; (pp. 655-661).
Andrea Polesel, et al.; Image Enhancement via Adaptive Unsharp Masking; IEEE Transactions on Image Processing, vol. 9, No. 3; Mar. 2000; (pp. 505-510).

* cited by examiner

*Primary Examiner*—Sherrie Hsia
(74) *Attorney, Agent, or Firm*—Conley Rose, P.C.

(57) ABSTRACT

A method and apparatus for adjusting the contrast of an input image is disclosed. Brightness level data of the input image is filtered to obtain at least a low frequency component and a high frequency component. The high frequency component is amplified. The input image and the amplified high frequency component are summed to produce brightness level data of the output image. The filtering is carried out by at least one recursive infinite impulse response filter having a single delay coefficient that is adaptive to areas of high contrast in the input image.

20 Claims, 6 Drawing Sheets

METHOD AND APPARATUS FOR ADJUSTING THE CONTRAST OF AN IMAGE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD OF THE INVENTION

The present invention relates to a method and apparatus for adjusting the contrast of an image.

BACKGROUND OF THE INVENTION

A number of techniques are known for adjusting the contrast of an image, particularly in order to improve the contrast and therefore visibility of the image. Contrast adjustment or enhancement of images, particularly digital images, is used in many fields, including enhancing the contrast of a digital image for display by a television receiver or other display device, for printing by a printer, in digital cameras, etc., etc. Contrast enhancement is used to improve the contrast in medical and other images.

Global contrast enhancement techniques remedy problems that manifest themselves in a global fashion, such as excessive or poor lighting conditions in the source environment. On the other hand, local contrast enhancement attempts to enhance the visibility of local details in the image.

A particular known local contrast enhancement method is adaptive contrast enhancement. An example is disclosed in "Digital Image Enhancement and Noise Filtering by Using Local Statistics", IEEE Trans. Pattern Anal. Machine Intell., vol. PAMI-2, pp. 165-168, February 1980, by J. S. Lee. The method disclosed in this paper is a modified form of unsharp masking technique. The method of this paper is shown schematically in FIG. 1. An input image 1 is filtered by a low pass filter 2, which effectively removes the "sharp" or high frequency component of the input image 1 to leave an unsharp or low frequency image. This unsharp or low frequency image is subtracted from the original image in a summer 3 to obtain the high frequency component of the input image 1. This high frequency component is amplified with a gain in an amplifier 4 and then added back to the input image 1 in a second summer 5 to produce the enhanced output image. However, this particular method amplifies the high frequency component with a fixed gain factor. This causes ringing or over/under shoot effects around the edges or other regions of high contrast in the original image because of the high values of the high frequency component around the edges after the amplification.

A modified version of this adaptive contrast enhancement technique is disclosed in "Real-time Adaptive Contrast Enhancement", IEEE Trans. Pattern Anal. Machine Intell., vol. PAMI-3, pp. 655-661, June 1981, by P. M. Narendra and R. C. Fitch. FIG. 2 shows schematically the method of this paper. The gain that is used to amplify the high frequency component is made to be inversely proportional to the local variance in the high frequency component. This modified method therefore adapts the spatial gain applied to the high frequency component according to local statistics in the high frequency component. However, this causes the gain to become very large when the local variance is small, which leads to noise amplification in smooth (low contrast) areas of the input image 1.

A further modification of the adaptive contrast enhancement techniques is disclosed in "Image Enhancement via Adaptive Unsharp Masking", IEEE Trans. On Image Processing, vol. 9, no. 3, March 2000, by A. Polesel, G. Ramponi and V. J. Matthews. In this modified technique, an adaptive filter is used to emphasise the medium contrast details in the image more than large contrast regions such as edges. However, the filter that is disclosed in this paper is a Laplacian filter which therefore has three tap coefficients and which is therefore computationally complex. As disclosed, the method of this paper requires 17 multiplications and one division operation to compute the output brightness level data for each pixel.

SUMMARY OF THE INVENTION

According to a first aspect of the present invention, there is provided a method of adjusting the contrast of an input image formed of pixels in which each pixel has an input brightness level to produce an output image in which at least some of the pixels have an output brightness level that is different from their input brightness level, the method comprising: filtering brightness level data of the input image to obtain at least a low frequency component and a high frequency component; amplifying the high frequency component; and, summing the low frequency component and the amplified high frequency component to produce brightness level data of the output image; wherein the filtering is carried out by at least one recursive infinite impulse response filter having a single delay coefficient that is adaptive to areas of high contrast in the input image.

By using a recursive infinite impulse response filter having a single delay coefficient, the computational complexity of the filtering process is minimised, which allows the method to be carried out quickly and/or with lower cost processing equipment. This makes it economic to implement the method in consumer equipment, such as a television receiver that receives and processes digital image signals. Because the delay coefficient is adaptive to areas of high contrast, the method of the present invention allows local contrast enhancement to be achieved in which for example edges in the input image are preserved whilst mid-range contrast details are filtered out. The method is therefore less prone to producing over/under shooting artefacts and other noise in the output image.

The delay coefficient is preferably a function of a local mean of brightness level data.

In a preferred embodiment, the delay coefficient at a current pixel is a function of the local mean of brightness level data at a previous pixel and brightness level data at the current pixel.

In one preferred embodiment the filtering is carried out by two recursive infinite impulse response filters each having a single delay coefficient that is adaptive to areas of high contrast in the input image, a first of said filters filtering the brightness level data in a first direction along lines of pixels and the second of said filters filtering the brightness level data in a second direction along the lines of pixels opposite the first direction, the average of the outputs of the first and second filters being used to produce said brightness level data of the output image.

As is known per se, a filter of this type can give rise to an unwanted phase delay. By using two filters which are run in opposite directions across the pixels, and by averaging the outputs of the two filters, the phase delays of the two filters can effectively be made to cancel each other out. The "lines" of pixels may be for example rows of pixels or columns of pixels. In a preferred embodiment, filtering is carried out (separately) for both the rows and the columns of pixels.

Preferably the delay coefficient at a current pixel for each of the filters is a function of the local mean of brightness level data at a previous pixel and brightness level data at the current pixel.

In one preferred embodiment, the first filter passes along rows of pixels in the direction of increasing column number, the delay coefficient $\lambda(m,n)$ at a current pixel at row m and column n in the input image for the first filter being:

$$\lambda(m, n) = \left[1 - \frac{|\mu_F(m, n-1) - x(m, n)|}{L}\right]^\alpha$$

where $\mu_F(m,n-1)$ is a local mean of brightness level data for the pixel at row m and column n−1, $x(m,n)$ is brightness level data for the current pixel, L is an integer having a value up to the number of brightness levels available in the input image less 1, and $\alpha$ is a constant; and, the second filter passes along the rows of pixels in the direction of decreasing column number, the delay coefficient $\lambda(m,n)$ at a current pixel at row m and column n in the input image for the second filter being:

$$\lambda(m, n) = \left[1 - \frac{|\mu_B(m, n+1) - x(m, n)|}{L}\right]^\alpha$$

where $\mu_B(m,n+1)$ is a local mean of brightness level data for the pixel at row m and column n+1, $x(m,n)$ is brightness level data for the current pixel, L is an integer having a value up to the number of brightness levels available in the input image less 1, and $\alpha$ is a constant.

In one preferred embodiment, the first filter passes along columns of pixels in the direction of increasing row number, the delay coefficient $\lambda(m,n)$ at a current pixel at row m and column n in the input image for the first filter being:

$$\lambda(m, n) = \left[1 - \frac{|\mu_F(m-1, n) - x(m, n)|}{L}\right]^\alpha$$

where $\mu_F(m-1,n)$ is a local mean of brightness level data for the pixel at row m−1 and column n, $x(m,n)$ is brightness level data for the current pixel, L is an integer having a value up to the number of brightness levels available in the input image less 1, and $\alpha$ is a constant; and, the second filter passes along the columns of pixels in the direction of decreasing row number, the delay coefficient $\lambda(m,n)$ at a current pixel at row m and column n in the input image for the second filter being:

$$\lambda(m, n) = \left[1 - \frac{|\mu_B(m+1, n) - x(m, n)|}{L}\right]^\alpha$$

where $\mu_B(m+1,n)$ is a local mean of brightness level data for the pixel at row m+1 and column n, $x(m,n)$ is brightness level data for the current pixel, L is an integer having a value up to the number of brightness levels available in the input image less 1, and $\alpha$ is a constant.

These preferred functions for the delay coefficient used at each pixel provide for good adaptation of the delay coefficient to deal with edges and other regions of high contrast in the input image. The value of the delay coefficient at an edge, for example, can be made to decrease strongly, thus preserving the edge in the output image. In an example, $\alpha$ has a value between 5 and 9. A value of 7 for a has been found to produce particularly good results.

In an embodiment, the high frequency component is amplified by a gain that is a function of the magnitude of the difference between the local mean of brightness level data and the input brightness level at said pixel. This helps to prevent further the production of unwanted artefacts in the output image.

According to a second aspect of the present invention, there is provided apparatus for adjusting the contrast of an input image formed of pixels in which each pixel has an input brightness level to produce an output image in which at least some of the pixels have an output brightness level that is different from their input brightness level, the apparatus comprising: at least one filter arranged to filter brightness level data of an input image to obtain at least a low frequency component and a high frequency component; an amplifier arranged to amplify the high frequency component; and, a summer arranged to sum the low frequency component and the amplified high frequency component to produce brightness level data of an output image; wherein the at least one filter is a recursive infinite impulse response filter having a single delay coefficient that is adaptive to areas of high contrast in the input image.

The delay coefficient is preferably a function of a local mean of brightness level data.

In a preferred embodiment, the delay coefficient at a current pixel is a function of the local mean of brightness level data at a previous pixel and brightness level data at the current pixel.

In one preferred embodiment the apparatus comprises two recursive infinite impulse response filters each having a single delay coefficient that is adaptive to areas of high contrast in the input image, a first of said filters being arranged to filter the brightness level data in a first direction along lines of pixels and the second of said filters being arranged to filter the brightness level data in a second direction along the lines of pixels opposite the first direction, the average of the outputs of the first and second filters being used to produce said brightness level data of the output image.

Preferably, the delay coefficient at a current pixel for each of the filters is a function of the local mean of brightness level data at a previous pixel and brightness level data at the current pixel.

In one preferred embodiment, the first filter is arranged to pass along rows of pixels in the direction of increasing column number; the delay coefficient $\lambda(m,n)$ at a current pixel at row m and column n in the input image for the first filter being:

$$\lambda(m, n) = \left[1 - \frac{|\mu_F(m, n-1) - x(m, n)|}{L}\right]^\alpha$$

where $\mu_F(m,n-1)$ is a local mean of brightness level data for the pixel at row m and column n−1, $x(m,n)$ is brightness level data for the current pixel, L is an integer having a value up to the number of brightness levels available in the input image less 1, and α is a constant; and, the second filter is arranged to pass along the rows of pixels in the direction of decreasing column number, the delay coefficient λ(m,n) at a current pixel at row m and column n in the input image for the second filter being:

$$\lambda(m, n) = \left[1 - \frac{|\mu_B(m, n+1) - x(m, n)|}{L}\right]^\alpha$$

where $\mu_B(m,n+1)$ is a local mean of brightness level data for the pixel at row m and column n+1, x(m,n) is brightness level data for the current pixel, L is an integer having a value up to the number of brightness levels available in the input image less 1, and α is a constant. In an example, α has a value between 5 and 9.

In one preferred embodiment, the first filter is arranged to pass along columns of pixels in the direction of increasing row number, the delay coefficient λ(m,n) at a current pixel at row m and column n in the input image for the first filter being:

$$\lambda(m, n) = \left[1 - \frac{|\mu_F(m-1, n) - x(m, n)|}{L}\right]^\alpha$$

where $\mu_F(m-1,n)$ is a local mean of brightness level data for the pixel at row m−1 and column n, x(m,n) is brightness level data for the current pixel, L is an integer having a value up to the number of brightness levels available in the input image less 1, and α is a constant; and, the second filter is arranged to pass along the columns of pixels in the direction of decreasing row number, the delay coefficient λ(m,n) at a current pixel at row m and column n in the input image for the second filter being:

$$\lambda(m, n) = \left[1 - \frac{|\mu_B(m+1, n) - x(m, n)|}{L}\right]^\alpha$$

where $\mu_B(m+1,n)$ is a local mean of brightness level data for the pixel at row m+1 and column n, x(m,n) is brightness level data for the current pixel, L is an integer having a value up to the number of brightness levels available in the input image less 1, and α is a constant.

In an embodiment, the amplifier is arranged to amplify the high frequency component by a gain that is a function of the magnitude of the difference between the local mean of brightness level data and the input brightness level at said pixel.

The preferred apparatus and/or method may be incorporated into any apparatus and/or method that is used to enhance the contrast of a digital image, including for example an image processor used in a television set or the like, printers, digital image processing software, etc., etc. The methods described herein may be carried out by appropriate software running on appropriate computer equipment. The software may be embedded in an integrated circuit, the integrated circuit being adapted for performing, or for use in the performance of, the relevant processes. Many of the processing steps may be carried out using software, dedicated hardware (such as ASICs), or a combination.

BRIEF DESCRIPTION OF THE DRAWINGS

Embodiments of the present invention will now be described by way of example with reference to the accompanying drawings, in which.

DETAILED DESCRIPTION OF THE PREFERRED EMBODIMENTS

Figure 1:
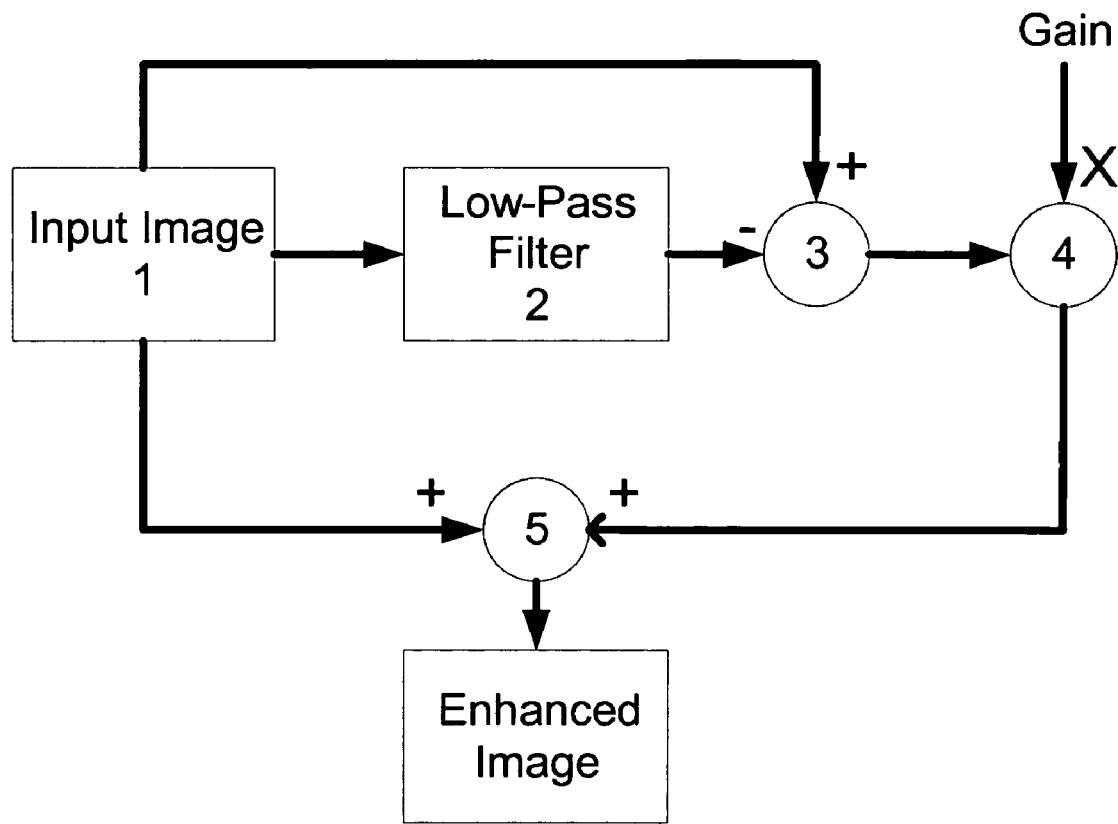
FIG. 1 and FIG. 2 show schematically two prior art methods of contrast enhancement.
Figure 2:
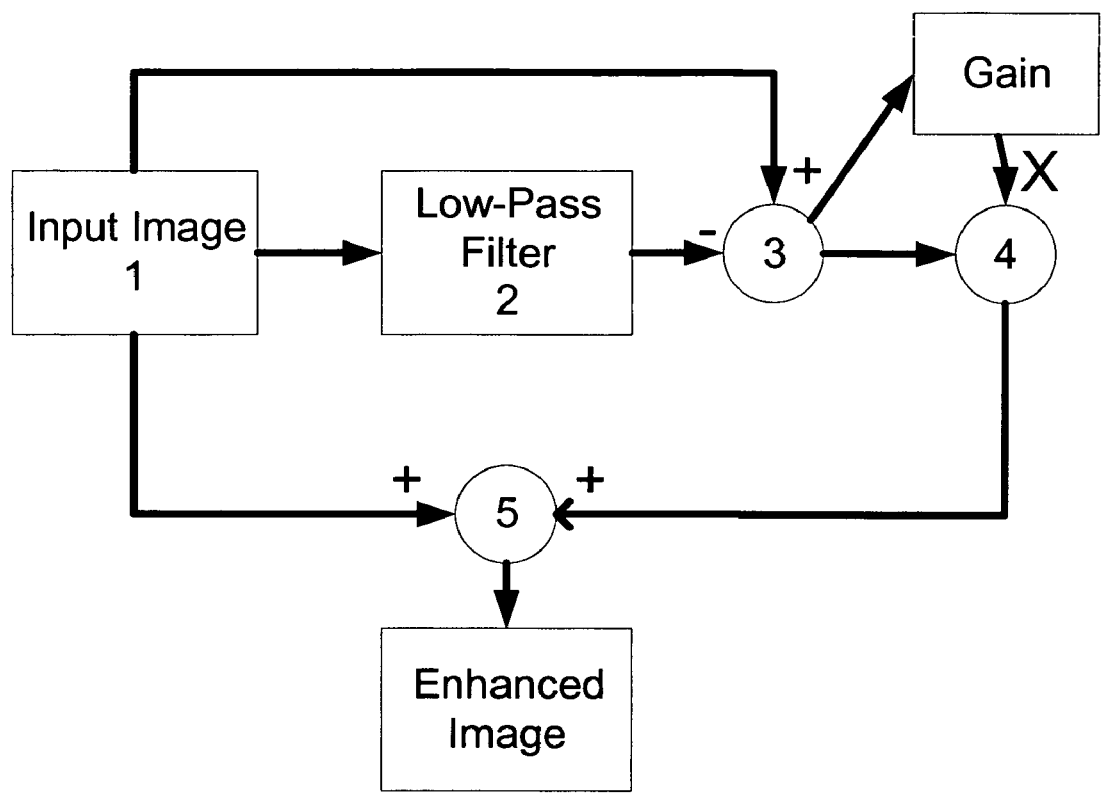
Figure 3:
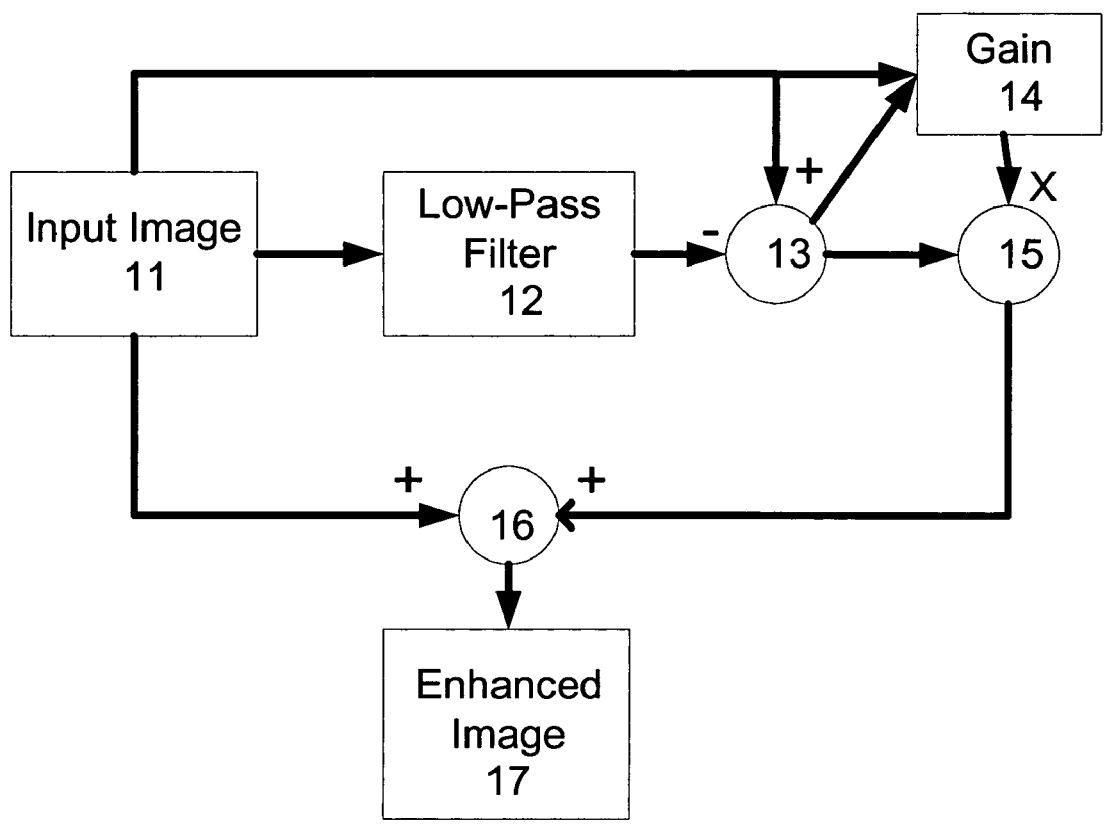
FIG. 3 shows schematically an overview of an example of a method according to the present invention.

Referring to FIG. 3, which shows schematically an overview of an example of a method according to the present invention, an original input image 11 is filtered by a low pass filter 12 which effectively removes the sharp or high frequency component of the input image 11 to leave an unsharp or low frequency image. This unsharp image is subtracted from the original image 11 in a summer 13, which therefore outputs the high frequency component. The high frequency component is multiplied with a gain factor obtained from a gain calculator 14 in an amplifier 15. The amplified high frequency component of the image is then added back to the original input image 11 in a second summer 16, which outputs the enhanced image 17. The gain that is provided by the gain calculator 14 is varied in the preferred embodiment, as will be discussed further below.

In adaptive contrast enhancement, mathematically the enhanced or output image y(m,n) is obtained from the input image x(m,n) as:

$$y(m,n)=\mu(m,n)+[1+g(m,n)][x(m,n)-\mu(m,n)] \quad (1)$$

where m is the row number and n is the column number of the pixels, μ(m,n) is the local mean of brightness levels, and g(m,n) is the enhancement gain (calculated by the gain calculator 14). The preferred embodiments use a locally adaptive non-linear filter to find the local mean μ(m,n) at each pixel. The filter can be regarded as a geometric averager of the brightness levels of the pixels.

The use of such a filter introduces a phase-shift in the filtered output. Accordingly, in the preferred embodiment, two filters are used. The first filter runs horizontally along a single row of pixels in a first direction, from left to right, and is referred to herein as the forward filter which outputs μF(m,n). The second filter runs in the opposite direction, from right to left horizontally along a single row of pixels, and is referred to herein as the backward filter which outputs μB(m,n). The local mean μ(m,n) that is used in the enhancement algorithm is given by the average of the outputs of the two filters, i.e.

$$\mu(m,n)=\tfrac{1}{2}[\mu_F(m,n)+\mu_B(m,n)] \quad (2)$$

The forward and backward filters that are used are each recursive infinite impulse response (IIR) filters. A "recursive" filter is one that uses recursion, i.e. the present value of the output signal is dependent on at least one previously calculated value of the output signal. An IIR filter has an impulse response that is non-zero over an infinite length of time, which is in contrast to finite impulse response (FIR) filters which have impulse responses of finite duration.

In the preferred embodiment, the input-output relationship for the forward filtered $\mu F(m,n)$ is:

$$\mu_F(m,n) = \lambda(m,n)\mu_F(m,n-1) + [1-\lambda(m,n)]x(m,n) \quad (3)$$

and the input-output relationship for the backward filtered $\mu_B(m,n)$ is:

$$\mu_B(m,n) = \lambda(m,n)\mu_B(m,n+1) + [1-\lambda(m,n)]x(m,n) \quad (4)$$

As can be seen, for each filter the local mean $\mu F(m,n)$ or $\mu B(m,n)$ at a pixel is dependent on the local mean at a previous pixel (i.e. $\mu F(m,n-1)$ and $\mu B(m,n+1)$ respectively) as well as the brightness level $x(m,n)$ at the current pixel. (Clearly, if attempting to filter the first pixels at the leftmost and rightmost ends of the row of pixels, there is no local mean at a previous pixel to be used in the recursive filters. This can be handled in a number of ways. In one example, the filtering begins at the second pixel from the left of a row for the forward filter and second pixel from the right of the row for the backward filter. In each case, the value that is used for the local mean at the previous pixel in the recursion equations (3) and (4) for these second pixels at the left and right of the row is the original brightness level of the first pixels respectively at the left and right of the row.)

In these filter relationships, $\lambda(m,n)$ is the delay coefficient. As can be seen, each filter has a single pole, namely the delay coefficient $\lambda(m,n)$. As will be discussed further below, this makes the filtering process computationally efficient.

In order to achieve adaptive contrast enhancement, the delay coefficient $\lambda(m,n)$ is adapted at each pixel to edge information, or information about other areas of high contrast, in the input image 11. Given that $\lambda(m,n)$ is effectively the weight of the previous output, a higher value of $\lambda(m,n)$ increases the low-pass characteristic of the filter. Accordingly, when an edge is encountered, $\lambda(m,n)$ should be decreased so that the edge will be preserved in the output.

The preferred edge signals that are used are:

$$|\mu_F(m,n-1) - x(m,n)| \quad (5)$$

for the forward filter, and $$|\mu_B(m,n+1) - x(m,n)| \quad (6)$$

for the backward filter. As will be appreciated, these edge signals are the differences between the original pixel value and the previous filter output.

Using these edge signals, $\lambda(m,n)$ for the forward filter is obtained in one example using:

$$\lambda(m,n) = \left[1 - \frac{|\mu_F(m,n-1) - x(m,n)|}{L}\right]^\alpha \quad (7)$$

and for the backward filter using:

$$\lambda(m,n) = \left[1 - \frac{|\mu_B(m,n+1) - x(m,n)|}{L}\right]^\alpha \quad (8)$$

Here, L can be any constant integer up to the maximum possible pixel value less 1, i.e. up to the number of brightness levels available in the input image less 1. In an example, the number of brightness levels available in the input image is 256, so in principle L may be set as any integer up to 255, with a high value (such as 255) being preferred. Preferred values for $\alpha$ are in the range of 5 to 9, with 7 being found to provide particularly good results.

As will be seen from an inspection of equations (7) and (8), strong edges reduce $\lambda(m,n)$ such that the low-pass characteristic of the filter at that location is reduced.

Figure 4:
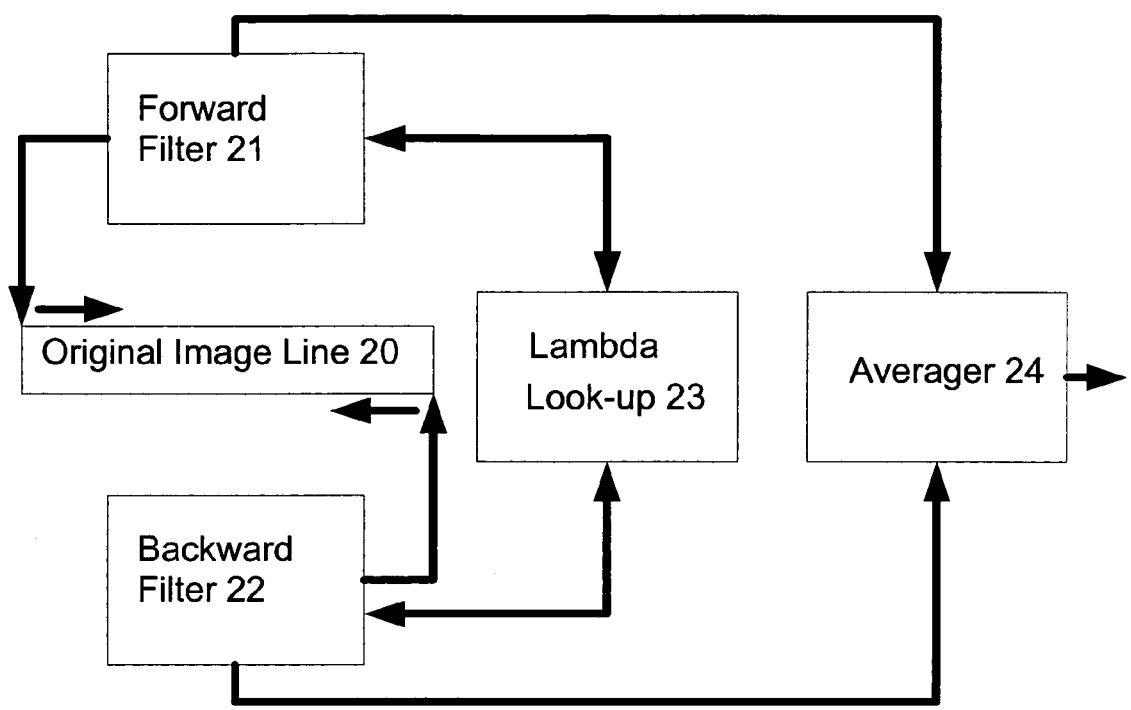
FIG. 4 shows schematically the operation of an example of two filters of an embodiment of the present invention.

The operation of the two filters is shown schematically in FIG. 4. In particular, there is shown a row of pixels 20. The forward filter 21 passes along the row 20 in a first direction, from left to right. The backward filter 22 passes in the opposite direction along the row 20 from right to left. A $\lambda$ look-up table 23 provides the required values of $\lambda$ at each pixel location. An averager 24 outputs the mean of the outputs of the forward and backward filters 21,22.

Equation (1) above can be rewritten as follows:

$$y(m,n) = x(m,n) + g(m,n)[x(m,n) - \mu(m,n)] \quad (9)$$

Thus, the output image can be seen as the sum of the input image (the first term in equation (9)) and the amplified high-pass filtered original image (the second term in equation (9)). The fact that the second term in equation (9) is the high-pass filtered original image can be seen from the fact that it is the difference between the original image and the low-pass filtered image.

The frequency response of the high-pass filter generating the second term in equation (9) is:

$$1 - H(\omega) = (\lambda^2 + \lambda)\frac{1 - \cos(\omega)}{1 - 2\lambda\cos(\omega) + \lambda^2} \quad (10)$$

Figure 5:
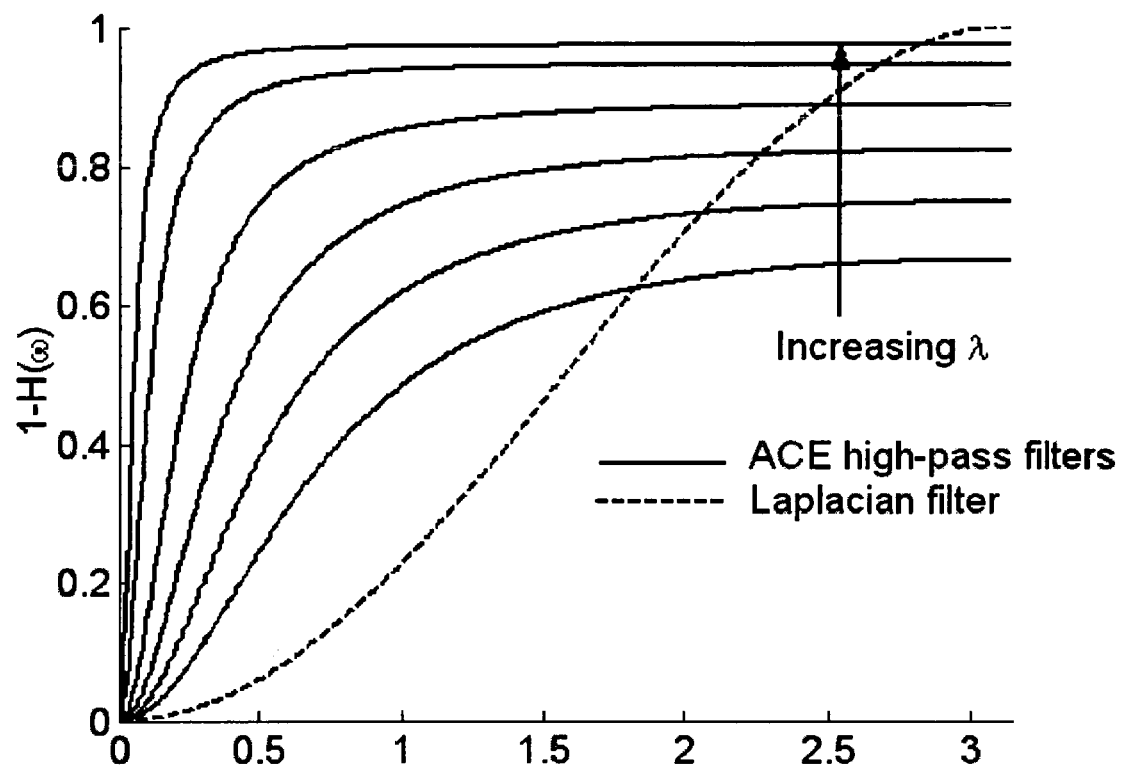
FIG. 5 shows schematically the frequency response of an example of the filters of an embodiment of the present invention; and, FIG. 6 shows schematically the variation of an example of an enhancement gain with the output of a high pass filter of an embodiment of the present invention.

A plot of equation (10) is shown in FIG. 5. As can be seen, the gain of the high-pass filter is approximately constant after some frequency threshold. Accordingly, not only are high frequencies being enhanced, but mid-range frequencies are also enhanced and with substantially the same magnitude. This increases the visual quality of the enhanced image because details that have their energy in the mid-range of the frequency spectrum are enhanced as well as the high frequency details. It can also be seen that the magnitude of the frequency response decreases with decreasing $\lambda$. Since $\lambda$ is a function of the edge signal, this demonstrates that the high-pass filter adapts itself to edges by reducing its magnitude. From equation (9), it can be seen that enhancement in the locality of edges decreases because the magnitude of the enhancement signal decreases accordingly. This adaptive behaviour allows the preferred contrast enhancement method to successfully avoid so-called over/under shooting artefacts.

By way of comparison, FIG. 5 also shows the corresponding plot in dashed lines for a Laplacian filter, which has three taps $\{-1, 2, -1\}$. As can be seen in FIG. 5, the Laplacian filter emphasises the high frequency components. Broadly speaking, the gain at high frequencies is about twice that at the mid-range frequencies. This causes two problems, namely noise sensitivity in the mid-range and over/under shooting around edges. A Laplacian filter also requires complex computation, as mentioned above.

In the above discussion, reference has been made principally to filtering in a forward and a backward direction along rows of pixels in the input image 11. The filtering may however be carried out by filtering in a forward and backward direction (i.e. up and down) columns of pixels in the input image 11. In the most preferred embodiment, filtering is carried out by two filters operating in opposite directions along the rows of pixels and by two filters operating in opposite directions along the columns of pixels.

In the preferred embodiment, the gain that is used to amplify the high frequency component is calculated by the gain calculator 14 in dependence on the original brightness level at the pixel and the magnitude of the difference between the local mean and the original pixel brightness level. The original pixel brightness level determines the maximum gain that can be applied to the current pixel.

The end user or system designer can select a gain within this range of possible gains. The maximum gain that can be used in enhancing is chosen by comparing the pixel value to two thresholds. The larger threshold, MaxSatLev, is chosen such that enhanced version of the pixel brightness level is less likely to saturate to the maximum available brightness level. The smaller threshold, MinSatLev, is chosen such that the enhanced version of the pixel brightness level is less likely to saturate to zero.

Given the maximum gain that can be used to enhance the high-frequency component, a user-selected maximum gain from the range of possible gains is used. This user-selected maximum gain is used to modulate a gain function. This gain function is a function of the magnitude of the difference between the local mean and the original pixel brightness level.

Figure 6:
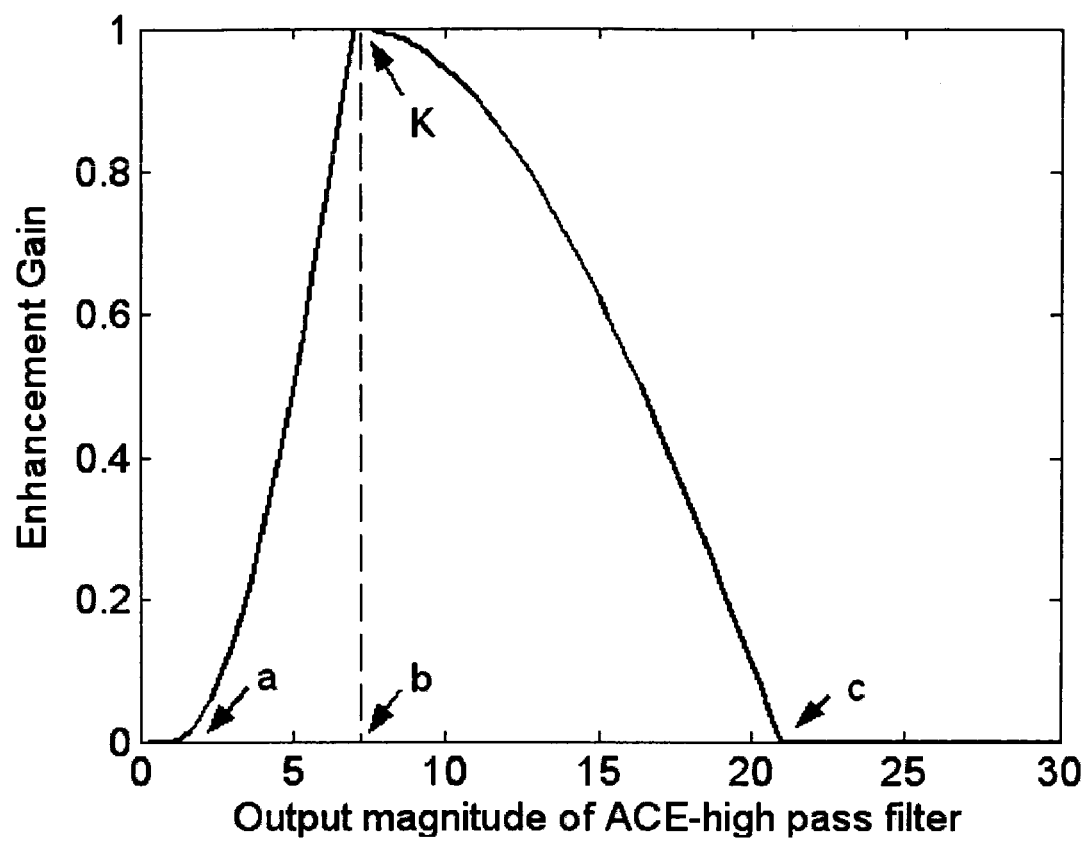

An example of one preferred gain function is:

```
if (Mdiff < a)
  gain = 0;
elseif (Mdiff < b)
  gain = K(cos(π+ π/2. (Mdiff−a)/(b−a))+1);
elseif (Mdiff <c)
  gain = Kcos(π/2. (Mdiff−b)/(c−b));
else
  gain=0;
end,
``` where K is the user-selected maximum gain, a, b, c are constants to be chosen by the designer, and Mdiff is the magnitude of the difference. In one particular example, a=1, b=7, c=21 and K=1. This particular example is shown schematically in FIG. 6.

When Mdiff is in the range [a,b], the gain function in the preferred embodiment is derived from a cosine that is evaluated in the 3rd quadrant. This produces a convex function, which better avoids noise enhancement by first slowly increasing and then rapidly increasing to the maximum user selected gain (i.e. K). When Mdiff is in the range [b,c], the function is derived from a cosine that is evaluated in the 1st quadrant. This produces a concave function, which better enhances the medium level frequency components in the image by first slowly decreasing and then rapidly decreasing to zero to avoid saturation.

It should be noted that the gain function can be any function with similar characteristics, namely: zero when the magnitude of the difference is less than some threshold, and again zero when the magnitude of the difference is greater than some threshold. The first condition ensures the preservation of smooth regions in the image. The second condition avoids saturation.

The computational complexity of the preferred method is extremely low because at each given pixel, two single pole IIR filters are used. The delay coefficient $\lambda$ of the filter does not have to be computed as such since $\lambda$ is determined by equations (7) and (8) and the edge signal that is input to this function is always an integer (in this example between zero and 255). Accordingly, for both $\lambda$ and the enhancement gain, respective look-up tables can be used. In a particular example, the total number of computations required per pixel, including the computation of the indices of the look-up tables, is two multiplications, six additions and one bit shift. This provides low computational complexity, which means that the method can be carried out quickly and/or in relatively low cost equipment. This makes the method particularly attractive for use in consumer equipment, such as television sets, computer displays, etc. The memory requirements are also low, being 256 bytes for the $\lambda$ look-up table, c bytes (21 in the example mentioned above) for the enhancement gain look-up table, one line store for the output of the forward filter and an additional single register for the output of the backward filter.

The present contrast enhancement method may be used prior to resizing of an image, particularly prior to zooming in on the image, so that edges will look sharper than otherwise. This is because the edges are enhanced prior to the resizing of the image. The method may be used to blur an image, for example so as to give depth perception to the image or before shrinking the image.

Embodiments of the present invention have been described with particular reference to the examples illustrated. However, it will be appreciated that variations and modifications may be made to the examples described within the scope of the present invention.

What is claimed is:

1. A method of adjusting the contrast of an input image formed of pixels in which each pixel has an input brightness level to produce an output image in which at least some of the pixels have an output brightness level that is different from their input brightness level, the method comprising:
   filtering brightness level data of the input image to obtain at least a low frequency component and a high frequency component;
   amplifying the high frequency component; and,
   summing the input image and the amplified high frequency component to produce brightness level data of the output image;
   wherein the filtering is carried out by at least one recursive infinite impulse response filter having a single delay coefficient that is adaptive to areas of high contrast in the input image.

2. A method according to claim 1, wherein the delay coefficient is a function of a local mean of brightness level data.

3. A method according to claim 1, wherein the delay coefficient at a current pixel is a function of the local mean of brightness level data at a previous pixel and brightness level data at the current pixel.

4. A method according to claim 1, wherein the filtering is carried out by two recursive infinite impulse response filters each having a single delay coefficient that is adaptive to areas of high contrast in the input image, a first of said filters filtering the brightness level data in a first direction along lines of pixels and the second of said filters filtering the brightness level data in a second direction along the lines of pixels opposite the first direction, the average of the outputs of the first and second filters being used to produce said brightness level data of the output image.

5. A method according to claim 4, wherein the delay coefficient at a current pixel for each of the filters is a function of the local mean of brightness level data at a previous pixel and brightness level data at the current pixel.

6. A method according to claim 4, wherein:
   the first filter passes along rows of pixels in the direction of increasing column number, the delay coefficient $\lambda(m,n)$ at a current pixel at row m and column n in the input image for the first filter being:

$$\lambda(m, n) = \left[1 - \frac{|\mu_F(m, n-1) - x(m, n)|}{L}\right]^{\alpha}$$

where $\mu_F(m,n-1)$ is a local mean of brightness level data for the pixel at row m and column n−1, x(m,n) is brightness level data for the current pixel, L is an integer having a value up to the number of brightness levels available in the input image less 1, and α is a constant; and, the second filter passes along the rows of pixels in the direction of decreasing column number, the delay coefficient λ(m,n) at a current pixel at row m and column n in the input image for the second filter being:

$$\lambda(m, n) = \left[1 - \frac{|\mu_B(m, n+1) - x(m, n)|}{L}\right]^{\alpha}$$

where $\mu_B(m,n+1)$ is a local mean of brightness level data for the pixel at row m and column n+1, x(m,n) is brightness level data for the current pixel, L is an integer having a value up to the number of brightness levels available in the input image less 1, and α is a constant.

7. A method according to claim 6, wherein α has a value between 5 and 9.

8. A method according to claim 4, wherein:

the first filter passes along columns of pixels in the direction of increasing row number, the delay coefficient λ(m,n) at a current pixel at row m and column n in the input image for the first filter being:

$$\lambda(m, n) = \left[1 - \frac{|\mu_F(m-1, n) - x(m, n)|}{L}\right]^{\alpha}$$

where $\mu_F(m-1,n)$ is a local mean of brightness level data for the pixel at row m−1 and column n, x(m,n) is brightness level data for the current pixel, L is an integer having a value up to the number of brightness levels available in the input image less 1, and α is a constant; and, the second filter passes along the columns of pixels in the direction of decreasing row number, the delay coefficient λ(m,n) at a current pixel at row m and column n in the input image for the second filter being:

$$\lambda(m, n) = \left[1 - \frac{|\mu_B(m+1, n) - x(m, n)|}{L}\right]^{\alpha}$$

where $\mu_B(m+1,n)$ is a local mean of brightness level data for the pixel at row m+1 and column n, x(m,n) is brightness level data for the current pixel, L is an integer having a value up to the number of brightness levels available in the input image less 1, and α is a constant.

9. A method according to claim 8, wherein α has a value between 5 and 9.

10. A method according to claim 1, wherein the high frequency component is amplified by a gain that is a function of the magnitude of the difference between the local mean of brightness level data and the input brightness level at said pixel.

11. Apparatus for adjusting the contrast of an input image formed of pixels in which each pixel has an input brightness level to produce an output image in which at least some of the pixels have an output brightness level that is different from their input brightness level, the apparatus comprising:

at least one filter arranged to filter brightness level data of an input image to obtain at least a low frequency component and a high frequency component;

an amplifier arranged to amplify the high frequency component; and, a summer arranged to sum the input image and the amplified high frequency component to produce brightness level data of an output image;

wherein the at least one filter is a recursive infinite impulse response filter having a single delay coefficient that is adaptive to areas of high contrast in the input image.

12. Apparatus according to claim 11, wherein the delay coefficient is a function of a local mean of brightness level data.

13. Apparatus according to claim 11, wherein the delay coefficient at a current pixel is a function of the local mean of brightness level data at a previous pixel and brightness level data at the current pixel.

14. Apparatus according to claim 11, comprising two recursive infinite impulse response filters each having a single delay coefficient that is adaptive to areas of high contrast in the input image, a first of said filters being arranged to filter the brightness level data in a first direction along lines of pixels and the second of said filters being arranged to filter the brightness level data in a second direction along the lines of pixels opposite the first direction, the average of the outputs of the first and second filters being used to produce said brightness level data of the output image.

15. Apparatus according to claim 14, wherein the delay coefficient at a current pixel for each of the filters is a function of the local mean of brightness level data at a previous pixel and brightness level data at the current pixel.

16. Apparatus according to claim 14, wherein:

the first filter is arranged to pass along rows of pixels in the direction of increasing column number, the delay coefficient λ(m,n) at a current pixel at row m and column n in the input image for the first filter being:

$$\lambda(m, n) = \left[1 - \frac{|\mu_F(m, n-1) - x(m, n)|}{L}\right]^{\alpha}$$

where $\mu_F(m,n-1)$ is a local mean of brightness level data for the pixel at row m and column n−1, x(m,n) is brightness level data for the current pixel, L is an integer having a value up to the number of brightness levels available in the input image less 1, and α is a constant; and, the second filter is arranged to pass along the rows of pixels in the direction of decreasing column number, the delay coefficient λ(m,n) at a current pixel at row m and column n in the input image for the second filter being:

$$\lambda(m, n) = \left[1 - \frac{|\mu_B(m, n+1) - x(m, n)|}{L}\right]^{\alpha}$$

where $\mu_B(m,n+1)$ is a local mean of brightness level data for the pixel at row m and column n+1, x(m,n) is brightness level data for the current pixel, L is an integer having a value up to the number of brightness levels available in the input image less 1, and α is a constant.

17. Apparatus according to claim 16, wherein α has a value between 5 and 9.

18. Apparatus according to claim 14, wherein:

the first filter is arranged to pass along columns of pixels in the direction of increasing row number, the delay coefficient λ(m,n) at a current pixel at row m and column n in the input image for the first filter being:

$$\lambda(m, n) = \left[1 - \frac{|\mu_F(m-1, n) - x(m, n)|}{L}\right]^\alpha$$

where $\mu_F(m-1,n)$ is a local mean of brightness level data for the pixel at row m−1 and column n, x(m,n) is brightness level data for the current pixel, L is an integer having a value up to the number of brightness levels available in the input image less 1, and α is a constant; and, the second filter is arranged to pass along the columns of pixels in the direction of decreasing row number, the delay coefficient λ(m,n) at a current pixel at row m and column n in the input image for the second filter being:

$$\lambda(m, n) = \left[1 - \frac{|\mu_B(m+1, n) - x(m, n)|}{L}\right]^\alpha$$

where $\mu_B(m+1,n)$ is a local mean of brightness level data for the pixel at row m+1 and column n, x(m,n) is brightness level data for the current pixel, L is an integer having a value up to the number of brightness levels available in the input image less 1, and α is a constant.

19. Apparatus according to claim 18, wherein α has a value between 5 and 9.

20. Apparatus according to claim 11, wherein the amplifier is arranged to amplify the high frequency component by a gain that is a function of the magnitude of the difference between the local mean of brightness level data and the input brightness level at said pixel.

\* \* \* \* \*